United States Patent
Hassan et al.

(10) Patent No.: US 7,647,182 B2
(45) Date of Patent: Jan. 12, 2010

(54) APPARENT DIP ANGLE CALCULATION AND IMAGE COMPRESSION BASED ON REGION OF INTEREST

(75) Inventors: Gamal A. Hassan, Houston, TX (US); Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 500 days.

(21) Appl. No.: 11/331,502

(22) Filed: Jan. 13, 2006

(65) Prior Publication Data

US 2008/0120035 A1    May 22, 2008

Related U.S. Application Data

(63) Continuation-in-part of application No. 10/892,011, filed on Jul. 15, 2004, now Pat. No. 7,200,492.

(51) Int. Cl.
*G01V 1/40* (2006.01)
*G01V 3/18* (2006.01)

(52) U.S. Cl. ............ 702/6; 175/50; 702/5; 702/10

(58) Field of Classification Search .......... 702/6, 702/7, 8, 10; 175/40, 50; 250/254, 264, 250/266, 268, 269.3; 382/131, 239, 264; 375/240.16, 340; 367/35
See application file for complete search history.

(56) References Cited

U.S. PATENT DOCUMENTS

| | | | |
|---|---|---|---|
| 3,202,822 A | 8/1965 | Kehler | 250/83.3 |
| 3,321,625 A | 5/1967 | Wahl | 250/71.5 |
| 3,846,631 A | 11/1974 | Kehler | 250/269 |
| 3,858,037 A | 12/1974 | Moore et al. | 253/193 |
| 3,864,569 A | 2/1975 | Tittman | 250/264 |
| 4,628,202 A | 12/1986 | Minette | 250/469 |
| 5,191,548 A | 3/1993 | Balkanski et al. | 364/725 |

(Continued)

FOREIGN PATENT DOCUMENTS

WO    WO2007/011719 A1    2/2007

OTHER PUBLICATIONS

Pamela Cosman et al.; *Memory Constrained Wavelet Based Image Coding*, IEEE Signal Processing Letters, vol. 5, No. 9, Sep. 1998.

(Continued)

*Primary Examiner*—John H Le
(74) *Attorney, Agent, or Firm*—Madan & Sriram, P.C.

(57) ABSTRACT

The present invention provides a method and apparatus for logging an earth formation and acquiring subsurface information wherein a logging tool is conveyed in borehole to obtain parameters of interest. The parameters of interest obtained may be density, acoustic, magnetic or electrical values as known in the art. The parameters of interest may be transmitted to the surface at a plurality of resolutions using a multi-resolution image compression method. Parameters of interest are formed into a plurality of Cost Functions from which Regions of Interest are determined to resolve characteristics of the Features of interest within the Regions. Feature characteristics may be determined to obtain time or depth positions of bed boundaries and borehole Dip Angle relative to subsurface structures, as well borehole and subsurface structure orientation. Characteristics of the Features include time, depth, and geometries of the subsurface such as structural dip, thickness, and lithologies.

14 Claims, 12 Drawing Sheets

U.S. PATENT DOCUMENTS

| | | | |
|---|---|---|---|
| 5,301,205 A | 4/1994 | Tsutsui et al. | 375/1 |
| 5,388,209 A | 2/1995 | Akagiri | 395/2.38 |
| 5,397,893 A | 3/1995 | Minette | 250/254 |
| 5,453,844 A | 9/1995 | George et al. | 358/426 |
| 5,513,528 A | 5/1996 | Holenka et al. | 73/151 |
| 5,519,668 A | 5/1996 | Montaron | 367/35 |
| 5,610,657 A | 3/1997 | Zhang | 348/415 |
| 5,684,693 A | 11/1997 | Li | 364/422 |
| 5,757,852 A | 5/1998 | Jericevic et al. | 375/240 |
| 5,867,806 A * | 2/1999 | Strickland et al. | 702/7 |
| 5,899,958 A * | 5/1999 | Dowell et al. | 702/6 |
| 6,049,623 A | 4/2000 | Fuderer et al. | 382/131 |
| 6,049,632 A | 4/2000 | Cockshott et al. | 382/239 |
| 6,307,199 B1 | 10/2001 | Edwards et al. | 250/269.3 |
| 6,405,136 B1 | 6/2002 | Li et al. | 702/10 |
| 6,584,837 B2 | 7/2003 | Kurkoski | 73/152.02 |
| 6,748,329 B2 | 6/2004 | Mandal | 702/14 |
| 6,885,942 B2 | 4/2005 | Shray et al. | 702/6 |
| 6,932,167 B2 * | 8/2005 | Proett et al. | 175/50 |
| 2002/0195276 A1 | 12/2002 | Dubinsky et al. | 175/40 |

OTHER PUBLICATIONS

Jerome M. Shapiro, *Embedded Image Coding Using Zerotrees of Wavelet Coefficients*, IEEE Transaction on Signal Processing, vol. 41, No. 12, Dec. 1993.

Nasir Rajpoot et al.; *Progressive Image Coding Using Augmented Zerotrees of Wavelet Coefficients*, Research Report CS-RR-350, Department of Computer Science, University of Warwick (UK), Sep. 1998.

Hassan et al.; *Zero Latency Image Compression for Real Time Logging While Drilling Applications*, XP-010920710, Oceans, 2005, Proceedings of MTS/IEEE Washington, D.C., Sep. 18-23, 2005, pp. 1-6, 14 Figs.

* cited by examiner

APPARENT DIP ANGLE CALCULATION AND IMAGE COMPRESSION BASED ON REGION OF INTEREST

CROSS REFERENCE TO RELATED APPLICATION

This application is a continuation-in-part of U.S. patent application Ser. No. 10/892,011 filed Jul. 15, 2004 now U.S. Pat. No. 7,200,492.

FIELD OF THE INVENTION

This invention relates generally to borehole logging apparatus for use during drilling operations and methods for acquiring subsurface measurements and communicating the data to the surface. More particularly, this invention relates to subsurface feature identification and efficient transmission of imaging data and subsurface structure data in real time in a measurement-while-drilling (MWD) tool.

BACKGROUND OF THE ART

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation to provide acquisition of a parameter of interest. As is well known in this art, these parameters of interest include electrical resistivity, acoustic energy, or nuclear measurements which directly or indirectly give information on subsurface densities, reflectances, boundaries, fluids and lithologies among many others.

Examples of prior art wireline density devices are disclosed in U.S. Pat. Nos. 3,202,822, 3,321,625, 3,846,631, 3,858,037, 3,864,569 and 4,628,202. Wireline formation evaluation tools (such as gamma ray density tools) have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling (MWD) logging either partly or totally eliminates the necessity of interrupting the drilling operation to remove the drillstring from the hole in order to make the necessary measurements obtainable by wireline techniques. In addition to the ability to log the characteristics of the formation through which the drill bit is passing, this information on a real time basis provides substantial safety and logistical advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,397,893 to Minette, the contents of which are fully incorporated herein by reference, teaches a method for analyzing data from a MWD formation evaluation logging tool which compensates for rotation of the logging tool (along with the rest of the drillstring) during measurement periods. The density measurement is combined with the measurement from a borehole caliper, preferably an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and ribs" algorithm and graphs such as that shown in FIG. 1. In the figure, the abscissa 1 is the difference between the LS and SS densities while the ordinate 3 is the correction that is applied to the LS density to give a corrected density using the curve 5.

U.S. Pat. No. 5,513,528 to Holenka et al teaches a method and apparatus for measuring formation characteristics as a function of azimuth about the borehole. The measurement apparatus includes a logging while drilling tool which turns in the borehole while drilling. The down vector of the tool is derived first by determining an angle φ between a vector to the earth's north magnetic pole, as referenced to the cross sectional plane of a measuring while drilling (MWD) tool and a gravity down vector as referenced in the plane. The logging while drilling (LWD) tool includes magnetometers and accelerometers placed orthogonally in a cross-sectional plane. Using the magnetometers and/or accelerometer measurements, the toolface angle can usually be determined. The angle φ is transmitted to the LWD tool thereby allowing a continuous determination of the gravity down position in the LWD tool. Quadrants, that is, angular distance segments, are measured from the down vector. Referring to FIG. 2 (which is Holenka et al's FIG. 10B illustrating a LWD tool 100 rotating in an inclined borehole 12), an assumption is made that the down vector defines a situation in which the standoff is at a minimum, allowing for a good spine and rib correction. A drawback of the Holenka et al method is that the assumption of minimum standoff is not necessarily satisfied, so that the down position may in fact correspond to a significant standoff; without a standoff correction the results may be erroneous.

In a centralized or stabilized tool, the standoff will generally be uniform with azimuth. Holenka (U.S. Pat. No. 5,513,528) and Edwards (U.S. Pat. No. 6,307,199) also show how azimuthal measurements of density may be diagnostic of bed boundaries intersected by an inclined borehole. In the absence of standoff corrections, this can only be a qualitative measurement.

U.S. Pat. No. 6,584,837 to Kurkoski, fully incorporated by reference herein, discloses a LWD density sensor that includes a gamma ray source and at least two NaI detectors spaced apart from the source for determining measurements indicative of the formation density. A magnetometer on the drill collar measures the relative azimuth of the NaI detectors. An acoustic caliper is used for making standoff measurements of the NaI detectors. Measurements made by the detectors are partitioned into spatial bins defined by standoff and azimuth. Within each azimuthal sector, the density measurements are compensated for standoff to provide a single density measurement for the sector. The azimuthal sectors are combined in such a way as to provide a compensated azimuthal geosteering density. The method of the invention may also be used with neutron porosity logging devices.

MWD instruments, in some cases, include a provision for sending at least some of the subsurface images and measurements acquired to recording equipment at the earth's surface at the time the measurements are made using a telemetry system (i.e. MWD telemetry). One such telemetry system modulates the pressure of a drilling fluid pumped through the drilling assembly to drill the wellbore. The fluid pressure modulation telemetry systems known in the art, however, are limited to transmitting data at a rate of at most only a few bits per second. Because the volume of data measured by the typical image-generating well logging instrument is relatively large, at present, borehole images are generally available only using electrical cable-conveyed instruments, or after an MWD instrument is removed from the wellbore and the contents of an internal storage device, or memory, are retrieved.

Many types of well logging instruments have been adapted to make measurements which can be converted into a visual representation or "image" of the wall of a wellbore drilled through earth formations. Typical instruments for developing images of parameters of interest measurements include density measuring devices, electrical resistivity measuring devices and acoustic reflectance/travel time measuring devices. These instruments measure a property of the earth formations proximate to the wall of the wellbore, or a related property, with respect to azimuthal direction, about a substantial portion of the circumference of the wellbore. The values of the property measured are correlated to both their depth position in the wellbore and to their azimuthal position with respect to some selected reference, such as geographic north or the gravitationally uppermost side of the wellbore. A visual representation is then developed by presenting the values, with respect to their depths and azimuthal orientations, for instance, using a color or gray tone which corresponds to the value of the measured property.

One method known in the art for transmitting image-generating measurements in pressure modulation telemetry is described, for example, in U.S. Pat. No. 5,519,668 issued to Montaron. This method includes making resistivity measurements at preselected azimuthal orientations, and transmitting the acquired resistivity values to the surface through the pressure modulation telemetry. The method described in the Montaron '668 patent requires synchronization of the resistivity measurements to known rotary orientations of the MWD instrument to be able to decode the image data at the surface without transmitting the corresponding rotary orientations at which the measurements were made.

U.S. Pat. No. 6,405,136 to Li, et al fully incorporated by reference herein, discloses a method for compressing a frame of data representing parameter values, a time at which each parameter value was recorded, and an orientation of a sensor at the time each parameter value was recorded. Generally the method includes performing a two-dimensional transform on the data in the orientation domain and in a domain related to the recording time. In one embodiment, the method includes calculating a logarithm of each parameter value. In one embodiment, the 2-D transform includes generating a Fourier transform of the logarithm of the parameter values in the azimuthal domain, generating a discrete cosine transform of the transform coefficients in the time domain. This embodiment includes quantizing the coefficients of the Fourier transform and the discrete cosine transform. One embodiment of the method is adapted to transmit resistivity measurements made by an LWD instrument in pressure modulation telemetry so that while-drilling images of a wellbore can be generated. The one embodiment includes encoding the quantized coefficients, error encoding the encoded coefficients, and applying the error encoded coefficients to the pressure modulation telemetry.

Other data compression techniques, for various applications, are described in several other U.S. patents, for example, U.S. Pat. No. 5,757,852 to Jericevic et al; U.S. Pat. No. 5,684,693 to Li; U.S. Pat. No. 5,191,548 to Balkanski et al; U.S. Pat. No. 5,301,205 to Tsutsui et al; U.S. Pat. No. 5,388,209 to Akagiri; U.S. Pat. No. 5,453,844 to George et al; U.S. Pat. No. 5,610,657 to Zhang; and U.S. Pat. No. 6,049,632 to Cockshott et al. Many prior art data compression techniques are not easily or efficiently applicable to the extremely low bandwidth and very high noise level of the communication methods of the typical MWD pressure modulation telemetry system, and, have not been suitable for image transmission by such telemetry.

U.S. application Ser. No. 10/167,332 (Publication 20020195276 A1) to Dubinsky et al, entitled "Use of Axial Accelerometer for Estimation of Instantaneous ROP Downhole for Lwd and Wireline Applications" the contents of which are incorporated herein by reference, disclose that determination of the rate of penetration (ROP) of drilling has usually been based upon surface measurements and may not be an accurate representation of the actual ROP. This can cause problems in Logging While Drilling (LWD). Because of the lack of a high-speed surface-to-downhole communication while drilling, a conventional method of measuring ROP at the surface does not provide a solution to this problem. However, the instantaneous ROP can be derived downhole with a certain degree of accuracy by utilizing an accelerometer placed in (or near) the tool to measure acceleration in the axial direction. When three-component accelerometers are used, the method may be used to determine the true vertical depth of the borehole.

There is a need for a method of determining subsurface features in downhole logging data, for example with azimuthal density variations from measurements made by a MWD logging tool. Such a method preferably provides for real-time determination of down hole parameter for communication to the surface, or provides for real time imaging of the subsurface environment during drilling operations. The present invention satisfies this need. It is desirable to have a system which enables transmission of data for imaging a wellbore through pressure modulation or other telemetry so that images of a wellbore can be developed during the drilling of a wellbore, wherein the rotary orientation of each image-developing measurement is included in the transmitted data. It is also desirable to efficiently and timely determine estimates of positions and orientations of boundaries between layers of earth formations.

SUMMARY OF THE INVENTION

The present invention provides a method and apparatus for logging an earth formation and acquiring subsurface information wherein a logging tool is conveyed in a borehole to obtain parameters of interest. The parameters of interest obtained may be density, acoustic, magnetic or electrical values as known in the art. As necessary, an azimuth associated with the parameters of interest measurements are obtained and corrections applied. The corrected data may be filtered and/or smoothed. The parameters of interest associated with azimuthal sectors are formed into a plurality of Cost Functions from which Regions of Interest are determined to resolve characteristics of the Features of interest within the Regions of Interest. Also, for initial delineation of Regions of Interest and associated Features, Cost Functions from a plurality of sectors may be combined to efficiently obtain prospective areas of the Cost Functions. Characteristics of these Features may be determined to obtain time or depth positions of bed boundaries and the Dip Angle of the borehole relative to subsurface structures, as well as the orientation of the logging equipment (borehole) and subsurface structure. Characteristics of the Features include time, depth, lithologies, structural depths, dip and thicknesses. The Regions of Interest may be generally characterized according to the behavior of the Regions in the neighborhood of various subsurface features. For example, a thin-bed type response may be characterized where the Region of Interest spans two local maxima with a local minimum between the maxima. There are at least four types of features (i.e. features of interest) that may be identified and/or extracted from Regions of Interest.

BRIEF DESCRIPTION OF THE FIGURES

The present invention and its advantages will be better understood by referring to the following detailed description and the attached drawings in which.

While the invention will be described in connection with its preferred embodiments, it will be understood that the invention is not limited thereto. It is intended to cover all alternatives, modifications, and equivalents which may be included within the spirit and scope of the invention, as defined by the appended claims.

DETAILED DESCRIPTION OF THE INVENTION

Figure 1:
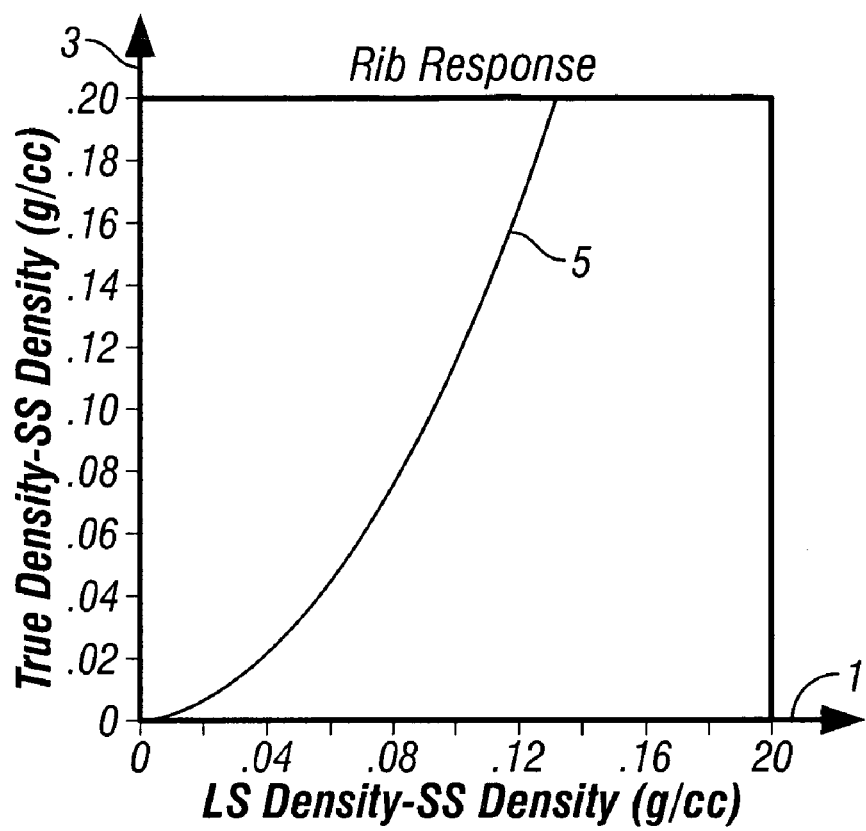
FIG. 1 (PRIOR ART) shows an example of how density measurements made from a long spaced and a short spaced tool are combined to give a corrected density.
Figure 2:
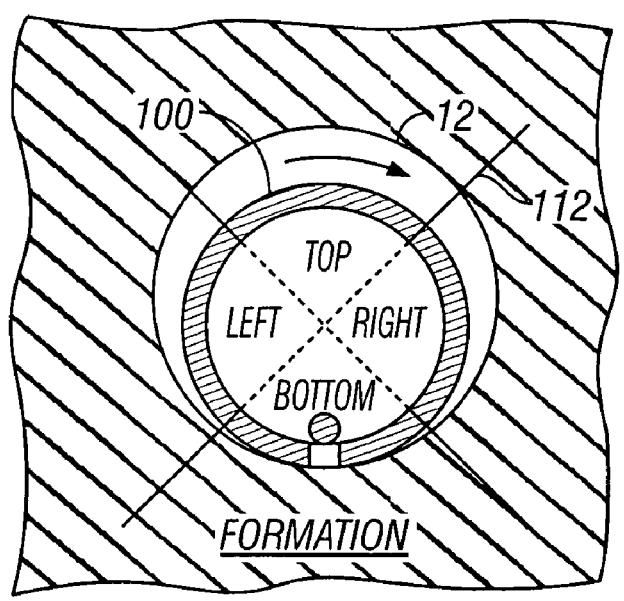
FIG. 2 (PRIOR ART) shows an idealized situation in which a rotating tool in a wellbore has a minimum standoff when the tool is at the bottom of the wellbore.
Figure 3:
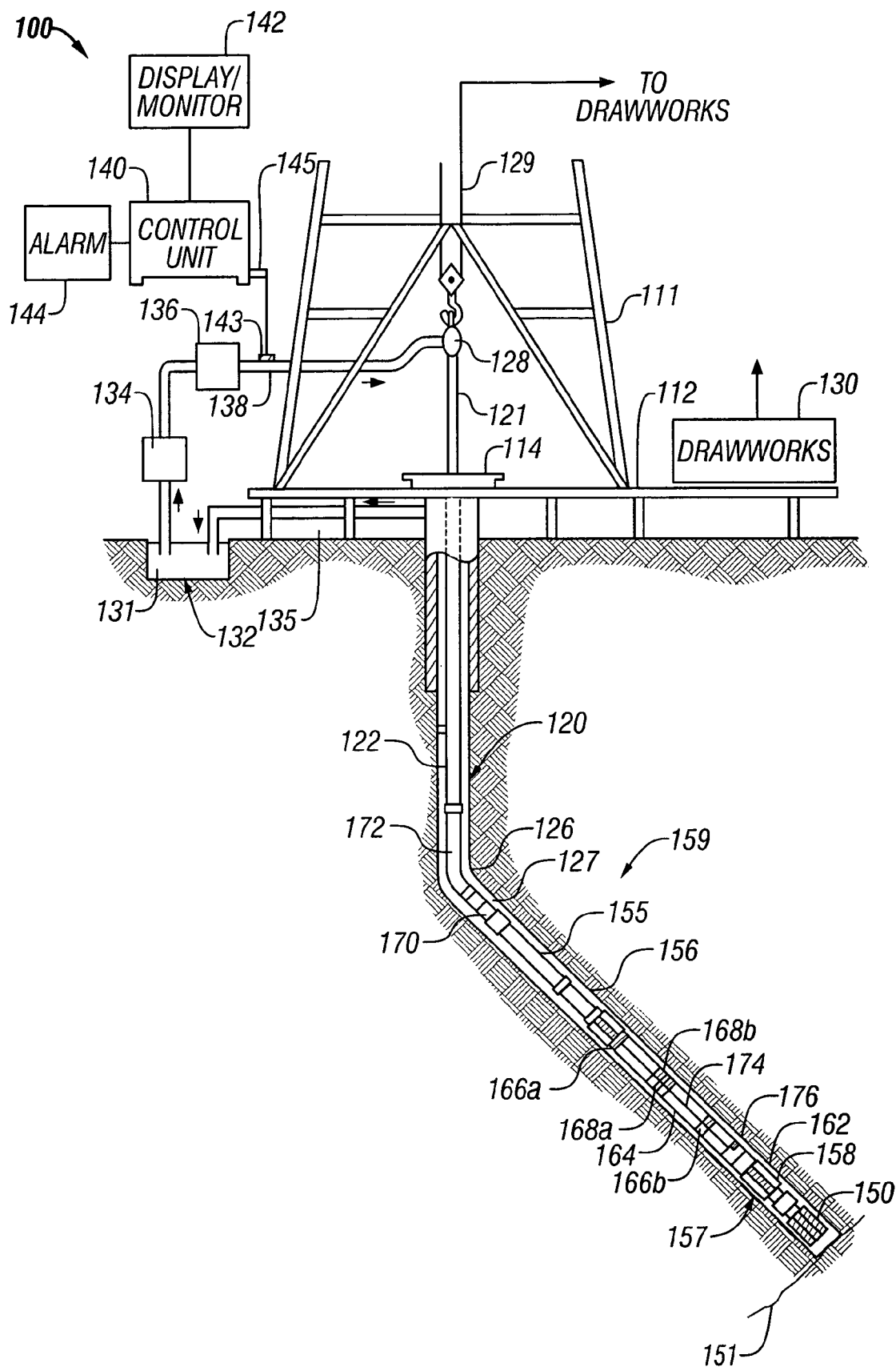
FIG. 3 shows a schematic diagram of a drilling system having a drill string that includes an apparatus according to the present invention.

FIG. 3 shows a schematic diagram of a drilling system 110 having a downhole assembly containing an acoustic sensor system and the surface devices according to one embodiment of present invention. As shown, the system 110 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 118 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein.

During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

A surface control unit 140 receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is preferably adapted to activate alarms 144 when certain unsafe or undesirable operating conditions occur.

A drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly.

In the preferred embodiment of the system of present invention, the downhole subassembly 159 (also referred to as the bottomhole assembly or "BHA") which contains the various sensors and MWD devices to provide information about the formation and downhole drilling parameters and the mud motor, is coupled between the drill bit 150 and the drill pipe 122. The downhole assembly 159 preferably is modular in construction, in that the various devices are interconnected sections so that the individual sections may be replaced when desired.

Still referring back to FIG. 3, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 164 is preferably coupled above the lower kick-off subassembly 162 that provides signals, from which resistivity of the formation near or in front of the drill bit 150 is determined. A dual propagation resistivity device ("DPR") having one or more pairs of transmitting antennae 166a and 166b spaced from one or more pairs of receiving antennae 168a and 168b is used. Magnetic dipoles are employed which operate in the medium frequency and lower high frequency spectrum. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole circuit that is preferably placed in a housing 170 above the mud motor 155 and transmitted to the surface control unit 140 using a suitable telemetry system 172. In addition to or instead of the propagation resistivity device, a suitable induction logging device may be used to measure formation resistivity.

The inclinometer 174 and gamma ray device 176 are suitably placed along the resistivity measuring device 164 for respectively determining the inclination of the portion of the drill string near the drill bit 150 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the resistivity measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In a preferred embodiment, the sensor assembly includes a resistivity device, gamma ray device and inclinometer, all of which are in a common housing between the drill bit and the mud motor. The downhole assembly of the present invention preferably includes a MWD section 168 which contains a nuclear formation porosity measuring device, a nuclear density device, an acoustic sensor system placed, and a formation testing system above the mud motor 164 in the housing 178 for providing information useful for evaluating and testing subsurface formations along borehole 126. A downhole processor may be used for processing the data.

Wireline logging tools have been used successfully to produce subsurface images. For MWD applications, density tool measurements and other measurements have been stored in the MWD tool's memory. Therefore subsurface images and parameter determinations haven't been generally available for real time applications such as geosteering.

The present invention which provides for acquiring parameters of interest is discussed with reference to a density measurement tool that emits nuclear energy, and more particularly gamma rays, but the method of the present invention is applicable to other types of logging instruments as well (e.g., acoustic methods, magnetic resonance and electrical methods). Wireline gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam. Instruments for making measurements of acoustic properties and gamma-gamma density have several advantages known in the art, and it should be understood that the instruments disclosed are not the only instruments that can be used to make such measurements. Accordingly, the invention is not to be limited to measurements of parameters of interest made by the particular instruments described herein.

The present invention provides for subsurface feature extraction, data compression, dip angle calculation, and semi-real-time data transmission to the surface. Transmission of raw or reduced subsurface data in near real-time to the surface provides for calculation of subsurface structure dip angles in semi or near real time for geosteering. The invention may be implemented in firmware and/or software downhole. For example, the invention provides for receiving the acquired subsurface data divided into sectors (eight, for example), the data are compressed, the apparent dip may be calculated, the data and/or the calculations may be transmitted to the surface and uncompressed for display. For example a formation bed boundary may display as a sine wave. An example product is a downhole apparatus with a processor with software that receives density data which may be divided into sectors (for example in eight sectors), compresses the data, calculates the apparent dip angle, formats the data for transmission, uncompresses the data at the surface and formats the data for further uses.

The compression algorithm and apparent dip angle calculation are based on feature extraction concepts. The present invention provides an implementation in three modules: i) compression, ii) reconstruction and iii) display.

The compression module receives data (which may be formatted in blocks) of the density for the standoff sectors, for example eight sectors, along with an optional set of parameters which may be selected from predefined parameters to customize the compression according to user need and a priori knowledge of the downhole environment. This module runs downhole to compress the image, code the image, calculate the parameters of the dip angle, code the parameters of the dip angle, format the data and transmit the data to the telemetry.

Figure 4:
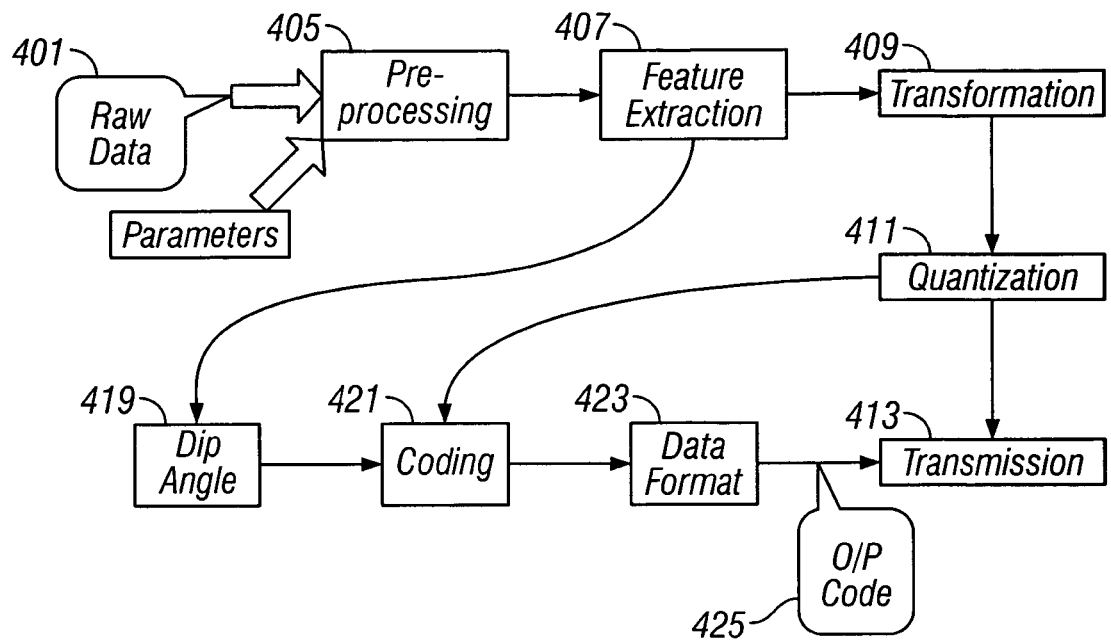
FIG. 4 illustrates a flow chart of the present invention.

FIG. 4 illustrates a block diagram. Raw data 401 along with selected parameters 403 goes into the Preprocessing Module 405. The Preprocessing Module 405 ensures that data values are in expected ranges, for example density is in the range from 1.5 gm/cc to 3 gm/cc. In the case where the density data has a value outside this range, the preprocessing module either interpolates the data or generates a segmentation based on the number of invalid or null data points. The preprocessing module receives both the data and the compression parameters from the memory module, which may be flash memory. The parameters may be preset or supplied by downlink.

The preprocessing module 405 performs three separate tasks. The first task is to get the parameters of the algorithm. Based on the downlink or preset parameters, the parameters are set in memory. The algorithm then passes the parameters to the data collection procedure. A flash memory module is one way that parameters and instructions may be stored and provided for the present invention.

The second task is data collection. Based on the parameters for the compression, pointers are going to be generated to point to the start of each data block that needs to be processed and the block lengths.

Third task is to check the density data values. In some cases density data values appear in the memory as a null value for many reasons. The preprocessing module 405 applies the following strategy on the null value: If the number of reading that contains a null value is less than or equal to a selected value, an interpolation is made. If the number of the null data that contains a null value is more than the selected value, the image is divided into two parts, which is called segmentation.

The Feature Extraction Module 407 runs if it has been chosen or enabled (for example in the flash memory parameters). The feature extraction module generates a cost function based on both the direction of the change and the change in the value of the parameter of interest (e.g., density data). Any maximum or minimum of that cost function, or variations of maxima and minima, indicates the possible locations of bed boundaries, i.e. the possibility of a feature. The region between the location of the two zeros around the maximum or the minimum that results from the first derivative of that cost function represents a region of interest i.e. the region that likely contains one or more features of interest. The block of data or number of samples within a cost function may be set arbitrarily. If the absolute value of the last value of the cost function is close to zero, it means that there are no features that share the current block of data and the next block of data. If the absolute value of the cost function value is close to or greater than one, it means that there are feature/features shared between/among the current block of data and the next block of data. The distance between the location of the last zero of the first derivative of the cost function and the end of the current data block determine an overlap region. The overlap region will be added to the next adjacent block of data. This guarantees that the next block of data will contain a complete feature.

Figure 5A:
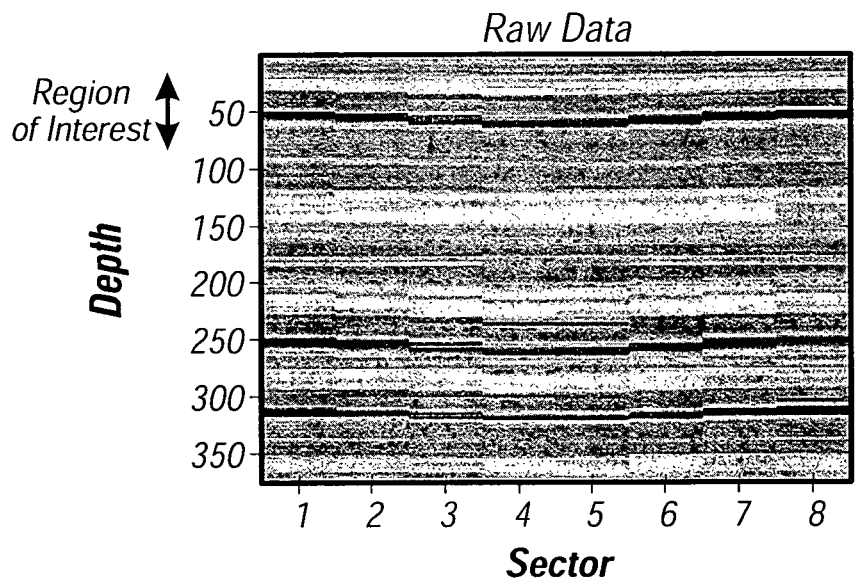
FIG. 5A illustrates raw density data with a Region of Interest.
Figure 5B:
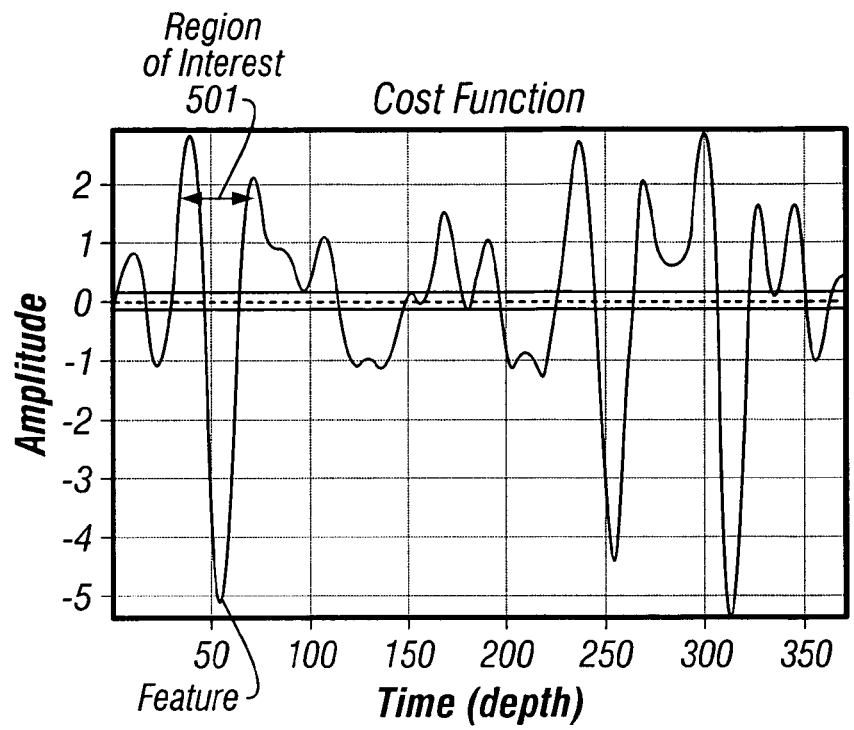
FIG. 5B illustrates a cost function display of obtained data with a Region of Interest and a Feature in the Region of Interest.

FIG. 5A illustrates raw data containing features of interest. FIG. 5B illustrates the Cost Function, including the Feature location and a Region of Interest. This feature could be a "thin bed" or other subsurface structure or bedding boundary.

Extracting the Feature characteristics from within the Cost Function is accomplished by examination and comparison of the behavior of the excursions of the waveform (or data trace) in relation to a chosen reference or in relation to localized changes in the Cost Function. As illustrated in FIG. 5B, the Cost Function is analyzed to discover parameters that satisfy all chosen constraints, and produce an optimum value for determining features of interest in the Cost Function. The Cost Function examination optimally works out how to adjust the design variables for subsequent runs. This produces an optimized design for efficient Feature identification and extraction. In the example shown here, the Region of Interest spans a waveform section of parameter values that is the area between and including two local maxima. These local maxima bracket a local minimum, which minimum coincides with the position of a Feature. Suitable wavelet functions may be chosen to deconvolve the Feature efficiently to delineate these maxima and minima in order obtain feature positions in terms of time, depth, dip angle or other characteristics.

Figure 5C:
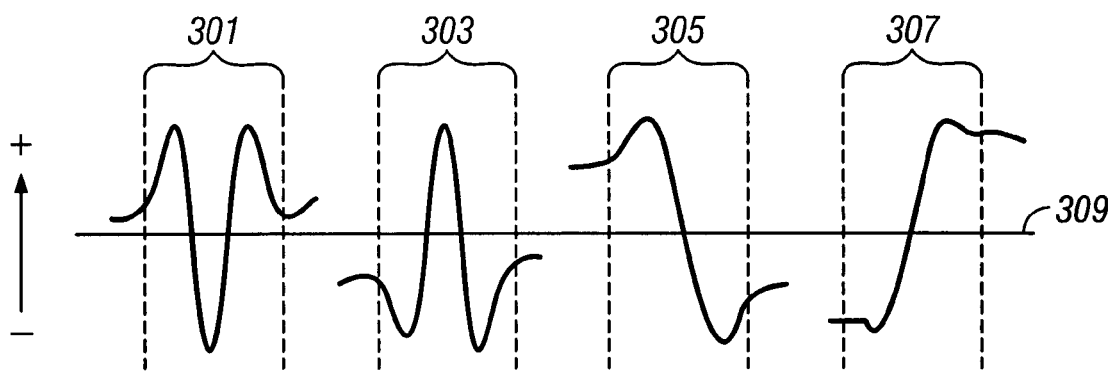
FIG. 5C illustrates types of Features that may be associated with a Region of Interest.

While FIG. 5B illustrates a Region of Interest spanning local minima, there are three other features of interest that may be found in and around a Region of Interest, which Features are illustrated in FIG. 5C relative to an arbitrary reference 509 demarking relative positive from relative negative values for purposes of illustration. Parameters of interest such as density may all be obtained as positive values, so it is the local variations that vary around an arbitrary reference. In addition to the local minima 501, other Feature types include local maxima 503, a transition from a local maximum to a local minimum 505, and a transition from a local minimum to a local maximum 507. A local maxima feature 503 could represent a low density thin bed; a local minimum 501 can represent a high density thin bed. Whether a bed is termed 'thin' or not, of course, is relative to both bed size and/or sample interval. An example of transition from local maximum to local minimum 505 is a step decrease in a density reading. An example of transition from local minimum to local maximum 507 is a step increase in a density reading. There are many choices for wavelets that may be used to efficiently identify Features within Regions of Interest.

Figure 6A:
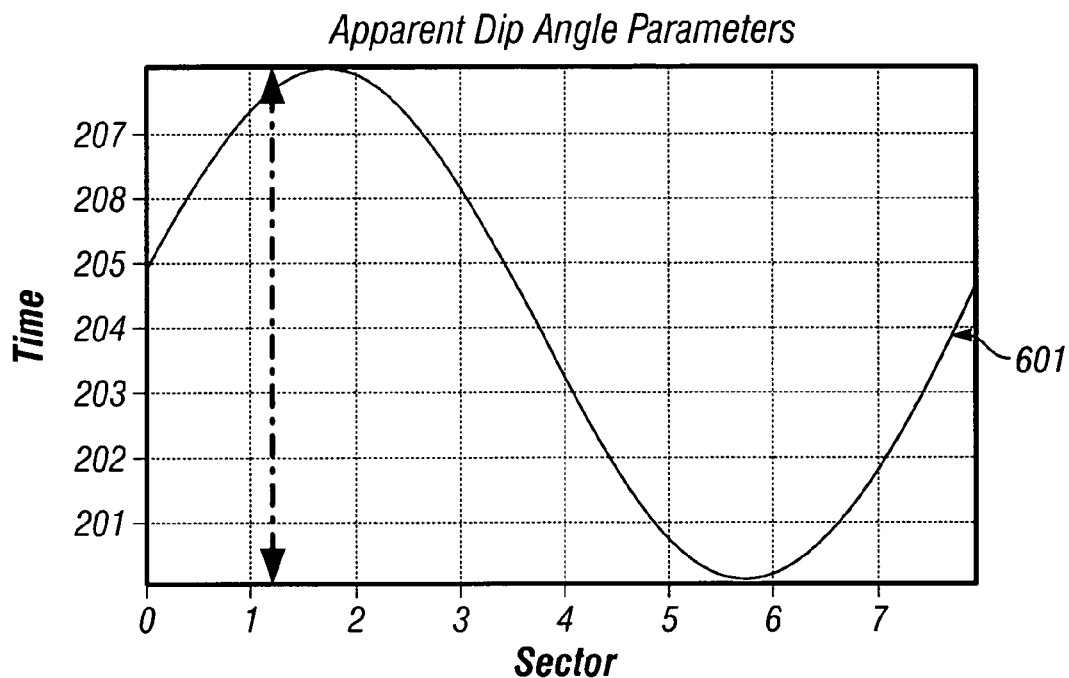
FIG. 6A illustrates a function that represents the Dip Angle relative to the well bore.
Figure 6B:
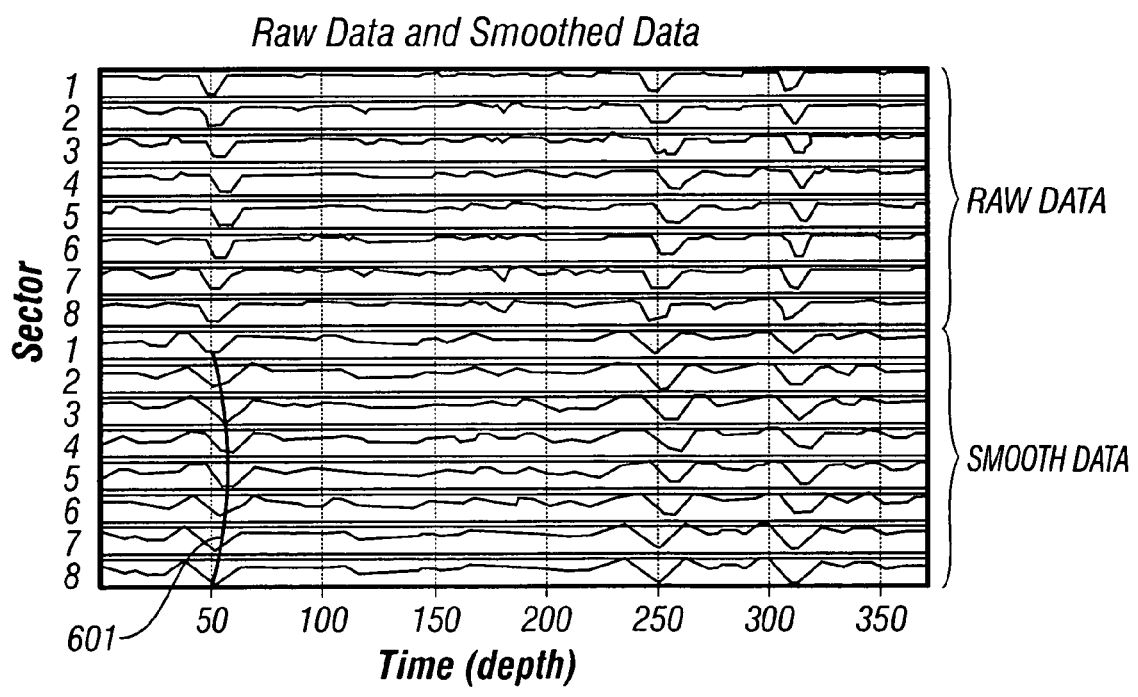
FIG. 6B illustrates the relationship of Regions of Interest with Features and Dip Angle among the several azimuthal sectors, and shows both raw and smoothed (filtered) data.

Calculation of the Apparent Dip Angle: Dip Angle calculation is illustrated at 419 in FIG. 4. Because a plane intersects a well bore as a periodic function, fitting a suitable mathematical function, for example a transcendental or a wavelet function, to the Feature position data as illustrated in FIG. 6A is straightforward (e.g., a Discrete Cosine Transform). FIG. 6A illustrates a function that represents the Dip Angle 601 relative to the well bore across several sectors. The dip angle function 601 along the sections of the well bore conforms to the Feature positions that have been determined from the analysis of the Cost Function. The Cost Function as illustrated in FIG. 6B across multiple azimuthal sectors indicates the location of the Region of Interest where a Feature exists along the Dip Angle 601. If the cost function has a minimum value it means that the density data has been decreasing and we will look for a local minimum value in the Region of Interest. If the cost function has a maximum value it means that the density data has been increased and we will look for a maximum within the Region of Interest (for example a Feature such as 501 in FIGS. 5B and 5C).

FIG. 6B illustrates a smoothed version of the data with the region of interest generated for each sector. The direction of change of the total density data may be examined in the eight sectors in both the Raw Data and the same eight sectors of the Smooth Data smoothed version for the raw data with the region of interest. For a decision to be made in preprocessing (e.g. FIG. 4 preprocessing 405) that there is a feature of interest in a specific location, the following parameters are a non-exclusive group that may be used: 1) The time location where the minimum or maximum value of the feature is located, 2) The peak to peak amplitude of the feature (and how many samples), 3) the direction of the apparent dip angle with respect to the tool (or borehole).

FIG. 6B shows the calculation of the apparent dip angle. The dip may be determined by fitting a function, for example the function represented by the line 601, superimposed on the Features of the data with adjacent sectors Region of Interest. The image trace of desired imaging features of interest such as bedding boundaries or other subsurface structure boundaries will most often cross boreholes with a sinusoidal behavior. Bedding boundaries will display as a sinusoid. This sinusoidal behavior of the Features (i.e., 601) allows a data compression related algorithm such as the 2-D Discrete Cosine Transform (DCT) to operate with good results, and for the apparent dip angle to fall out of the compression process when energy of the transform terms is minimized.

Transformation is illustrated at 409 in FIG. 4. The 2-D Discrete Cosine Transform (DCT) has been used as a method of energy localization. The 1-D DCT for a vector of length N is given by equation (1), for the range m to N-1. The DCT will be calculated in the sector direction then in the time or depth dimension.

$$\begin{cases} y(m) = \sqrt{\frac{2}{N}} \sum_{k=0}^{N-1} x(k)\cos\frac{(2k+1)m\pi}{2N} & m = 0 \\ y(m) = \sqrt{\frac{2}{N}} \sum_{k=0}^{N-1} x(k)\cos\frac{(2k+1)m\pi}{2N} & m \neq 0 \end{cases} \quad (1)$$

Since the density data range from 1.5 g/cc to 3.00 g/cc (within a fairly narrow range), the Discrete Cosine (DC) value may be replaced by the difference between the DC value and its estimate. The estimate value of the DC is based on the size of the data.

Figure 7:
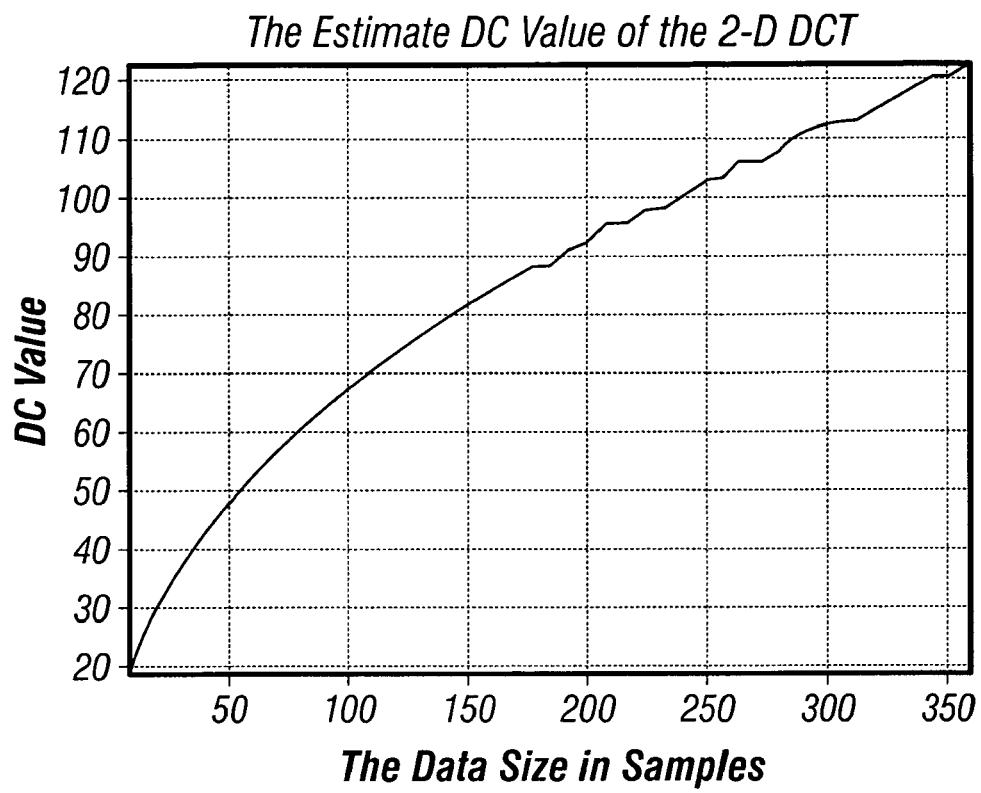
FIG. 7 illustrates an estimate of data size sample versus DC value for the Discrete Cosine Transform.

FIG. 7 illustrates the estimate DC value of the 2-D DCT. The x-axis shows the size of the data. The y-axis shows the estimate DC value of the 2-D DCT.

The output matrix of DCT coefficients contains integers. The signal energy lies at relatively low frequencies; these appear in the upper left corner of the DCT (Table 1). The lower right values represent higher frequencies, and are often small enough to be neglected with little visible distortion. Table 1 shows how the DCT operates on the 8 by 8 matrix.

TABLE 1

(was Table 2): DCT Coefficients

| 92 | 3 | −9 | −7 | 3 | −1 | 0 | 2 |
| −39 | −85 | 12 | 17 | −2 | 2 | 4 | 2 |
| −84 | 62 | 1 | −18 | 3 | 4 | −5 | 5 |
| −52 | −36 | −10 | 14 | −10 | 4 | −2 | 0 |
| −86 | −40 | −49 | −7 | 17 | −6 | −2 | 6 |
| −62 | 65 | −12 | −2 | 3 | −8 | −2 | 0 |
| −17 | 14 | −36 | 17 | −11 | 3 | 3 | −1 |
| −54 | 32 | −9 | −9 | 22 | 0 | 1 | 3 |

Quantization is illustrated at 411 in FIG. 4. There is a tradeoff between image quality and the degree of quantization. A large quantization step size can produce unacceptably large image distortion. This effect is similar to quantizing Fourier series coefficients too coarsely; large distortions would result. Unfortunately, finer quantization leads to lower compression ratios. The question is how to quantize the DCT coefficients most efficiently. Because of human eyesight's natural high frequency roll-off, these frequencies play a less important role than low frequencies. This lets JPEG use a much higher step size for the high frequency coefficients, with little noticeable image deterioration.

The quantization matrix is the 8 by 8 matrix of step sizes (sometimes called quantum)—one element for each DCT coefficient. It is usually symmetric. Step sizes will be small in the upper left (low frequencies), and large in the upper right (high frequencies); a step size of 1 is the most precise. The quantizer divides the DCT coefficient by its corresponding quantum and then rounds to the nearest integer. Large quantization matrix coefficients drive small coefficients down to zero. The result: many high frequency coefficients become zero, and therefore easier to code. The low frequency coefficients undergo only minor adjustment. By choosing parameterization of the matrices efficiently, zeros among the high frequency coefficients leads to efficient compression. Table 2 shows the quantization matrix.

TABLE 2

The Quantization Matrix

| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |
| 9 | 10 | 11 | 12 | 13 | 14 | 15 | 16 |
| 10 | 11 | 12 | 13 | 14 | 15 | 16 | 17 |

TABLE 4

The quantized Data

| 30 | 0 | −1 | 0 | 0 | 0 | 0 | 0 |
| −7 | −8 | 1 | 1 | 0 | 0 | 0 | 0 |
| −12 | 6 | 0 | −1 | 0 | 0 | 0 | 0 |
| −5 | −3 | 0 | 0 | 0 | 0 | 0 | 0 |
| −7 | −3 | 3 | 0 | 0 | 0 | 0 | 0 |
| −4 | 4 | 0 | 0 | 0 | 0 | 0 | 0 |
| −1 | 0 | −1 | 0 | 0 | 0 | 0 | 0 |
| −3 | 1 | 0 | 0 | 0 | 0 | 0 | 0 |

Figure 8:
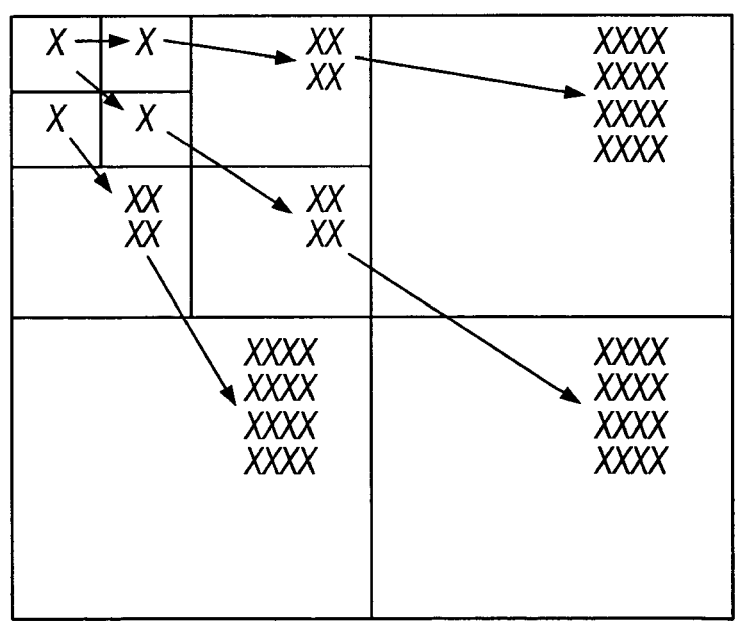
FIG. 8 illustrates a data scanning method according to the Embedded Zerotree Wavelet Encoder.

Table 3 shows the quantized data of given in Table 1. Quantization has been done into two steps: 1) Dynamic range reduction. 2) EZW (Embedded Zerotree Wavelet Encoder). A linear quantizer has been used. However, in some cases some of the coefficients have a very big value relative to other coefficient values. Most probably those values will be located in the first column of data based on the property of the 2-D DCT. The number of the elements in the first column depends on the data size, however for a data size of length less than 360, it appears that if there is a big coefficient they have a big chance to appear in the first eight element of the first column. So the integer value of the first few coefficients will be coded separately and they will be replaced by the difference between the actual value and the coded value. The rest of the data will be multiplied by 100 and converted into integers, and then it will be quantized according to the EZW method. FIG. 8 shows how the EZW method scans the image. See *Embedded Image Coding Using Zerotrees of Wavelet Coefficients*, Shapiro, J. M., IEEE Transactions on Signal Processing, Vol. 41. No 12, December 1993, or N. M. Rajpoot and R. G. Wilson, *Progressive Image Coding using Augmented*

*Zerotrees of Wavelet Coefficients*, Research Report CS-RR-350, Department of Computer Science, University of Warwick (UK), September 1998.

The image will be scanned in multiple passes. In every pass the elements will be compared to a threshold. If the element values exceed the threshold (e.g. the threshold could equal 20, but this will be data and/or area dependent) it will be replaced by the actual value of the elements minus 1.5 times the threshold. Then the threshold will be reduced in a predetermined order and more passes will be done until the maximum allowable size of the data will be achieved.

The quantized data may be coded into different formats at 423 in FIG. 4 depending on whether an image or only selected parameters (e.g. Dip Angle, Feature depth, and other associated characteristics) are to be transmitted to the surface. The first format is for dip angle transmission (e.g., from 419 to 421 in FIG. 4); the second format is for image transmission (as illustrated from 411 to 421 in FIG. 4). An example for Dip Angle parameters may be coded as follows: The buffer size will be set to 6 bytes. The first bit as zero indicates the that the packet has dip angle data, the next 17 bits indicate the time where the minimum of the feature has occur, the next 8 bits indicate the amplitude of the feature, and the next three bits indicate the sector where the maximum has occurred. After data are coded and formatted, the data may be further formatted and compressing and encoded such that the encoded, compressed values are applied (425 FIG. 3) to a selected position in a telemetry format for transmission (413 FIG. 4) to the surface recording unit.

If the data are for an image, the first bit of the code will be '1' indicating that the image has data followed by 17 bits for the time of the first data, followed by some overhead, then the data. The data will be coded into parts: 1) The Dynamic range reduction Code; 2) The EZW Code. The Dynamic Range Reduction Code: the first eight data points assigning three bits for every point. If the data point has a maximum value it indicates that the next value should be added to the current value to the actual data value. The output of the EZW is one of the four symbols (P, N, Z, and T). Where is the symbol T has more probability to be found in the data, T is going to be assigned to 0, Z is going to be assigned 10, N is going to be assigned 110, and P is going to be assigned 111.

The EZW (Embedded Zerotree Wavelet Encoder) may be inefficient when it is used with DCT coefficients. However, by rearranging the DCT blocks in specific order, it is possible to use EZW with DCT in a very efficient way, and thereby further, to transmit data in multiple resolutions so that a plurality of resolutions of the data may be transmitted and recombined according to the ultimate resolution desired. The Discrete Cosine Transform may be used for multi-resolution image compression to compress and decompose the Image with low computations compared to wavelets. It allows for the transmission of one or more resolution levels of the compressed image in a noise channel, and possibly losing only a resolution level or partial resolution level due to noise instead of losing the entire image. Also the images and/or compressed images can be stored in the memory (e.g., in flash memory) downhole in high resolution format, so the user can transmit only the resolution or plurality of resolutions needed or desired per image based on the setting for the algorithm parameters.

Matrix Rearrangement: the input image will be dividing into N by N blocks, and the DCT will be used on every block. The DC coefficient of every block will be replaced by the difference between the DC coefficient and its estimate value. The new DCT matrixes will be rearrange into new matrix suitable for LZW. Table 5 and Table 6 show two blocks of DCT matrix. The two block of the DCT will be arranged into a new matrix as following.

TABLE 5

The DCT of two blocks

| 40 | 2 | −1 | −3 | 0 | 0 | 0 | 0 |
|---|---|---|---|---|---|---|---|
| 20 | −8 | 1 | 1 | 0 | 0 | 0 | 0 |
| −12 | 5 | 2 | −1 | 0 | 0 | 0 | 0 |
| −2 | 11 | 5 | 0 | 0 | 0 | 0 | 0 |
| 10 | 14 | 0 | 0 | 0 | 0 | 0 | 0 |
| −3 | 4 | 1 | 0 | 0 | 0 | 0 | 0 |
| 14 | 2 | 0 | 1 | 0 | 0 | 0 | 0 |
| 6 | 3 | 1 | 0 | 0 | 0 | 0 | 0 |

The first column of the DCT block will become the first row on the new if the dimensions of the new matrix allows, if not it will start from the next row of the new matrix. The second columns of the DCT blocks of the new matrix as above until the all the DCT blocks has been scanned. The new matrix may not be symmetric but the LSW can work in non symmetric matrix and still give compression ration higher than the JPEG. Symmetric matrix gives much higher compression ratio. Table 6 shows the new matrix after rotation for two DCT blocks.

The image will be scanned in multiple passes in every pass the every element will be indicated if it is above a threshold, the threshold if it is above the threshold it will be replaced by the actual value of the elements minus 1.5 times the threshold. The threshold will be reduced in predetermined order and more pass will be done until the maximum allowable size of the data will be achieved.

TABLE 6

The DCT of the new matrix after rearrangement of the DCT blocks

| −15 | −7 | −12 | −5 | −7 | −4 | −1 | −3 |
|---|---|---|---|---|---|---|---|
| 5 | 20 | −12 | −2 | 10 | −3 | 14 | 6 |
| 0 | −8 | 6 | −3 | −3 | 4 | 0 | 1 |
| 2 | −8 | 5 | 11 | 14 | 4 | 2 | 3 |
| −1 | 1 | 0 | 0 | 3 | 0 | −1 | 0 |
| −1 | 1 | 2 | 5 | 0 | 1 | 0 | 1 |
| 0 | 1 | −1 | 0 | 0 | 0 | 0 | 0 |
| −3 | 1 | −1 | 0 | 0 | 0 | 1 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Reconstruction Module: The second module runs at the surface. The module receives block/blocks of binary number that are transmitted and a copy of the selected parameters. The second module may be implemented, for example, as an executable file using Matlab.

The output of the second module may be an ASCII file that represents the image at time bases. The second module encodes the received block/blocks of data and determines if the data represents an image or represents the parameters of the apparent dip angle. If the received blocked is an image, the second module generates an ASCII file. The first row of the ASCII file represents the time of every reading in the next eight columns. The first column has the time (hh:mm:ss), and the second column to the ninth column has the density data that represent the image.

Figure 9:
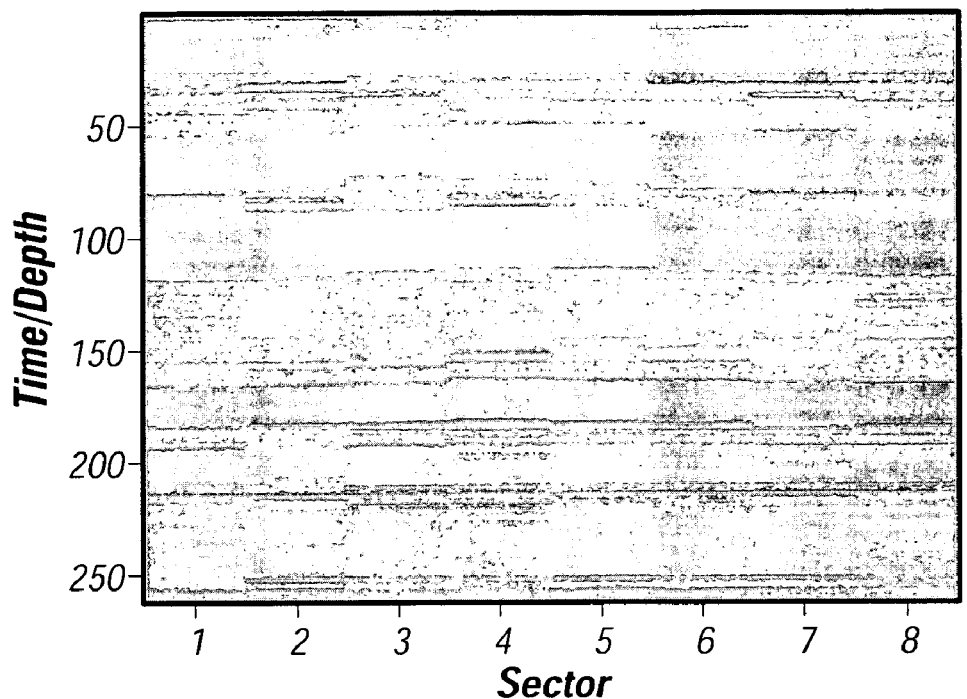
FIG. 9 illustrates raw density data across 8 sectors.
Figure 10:
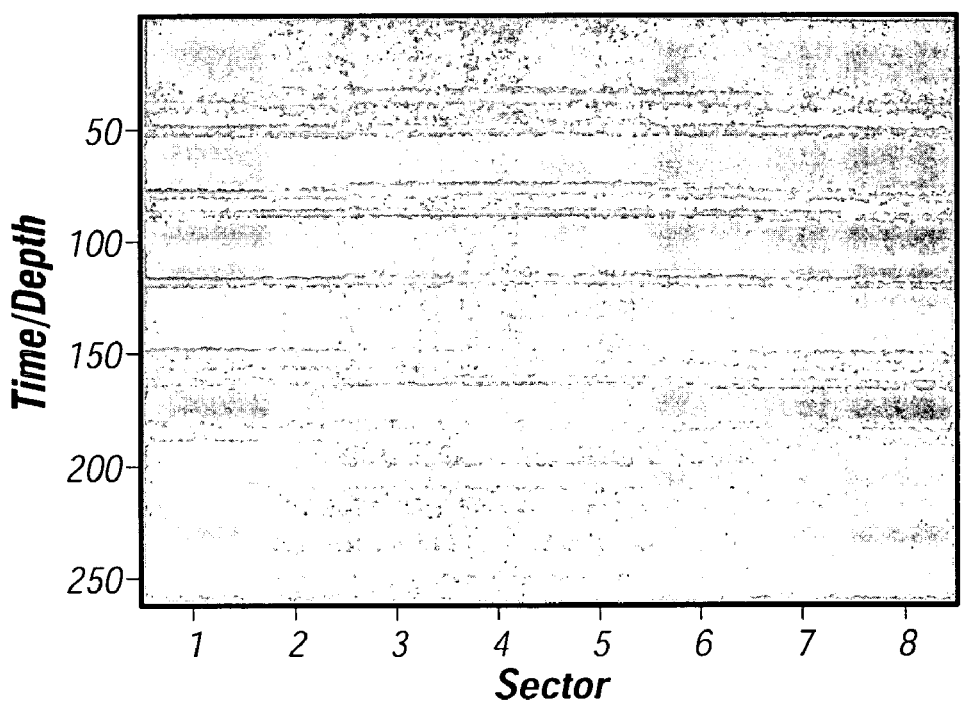
FIG. 10 illustrates an uncompressed image reconstructed using the present invention with a compression of 300:1.
Figure 11:
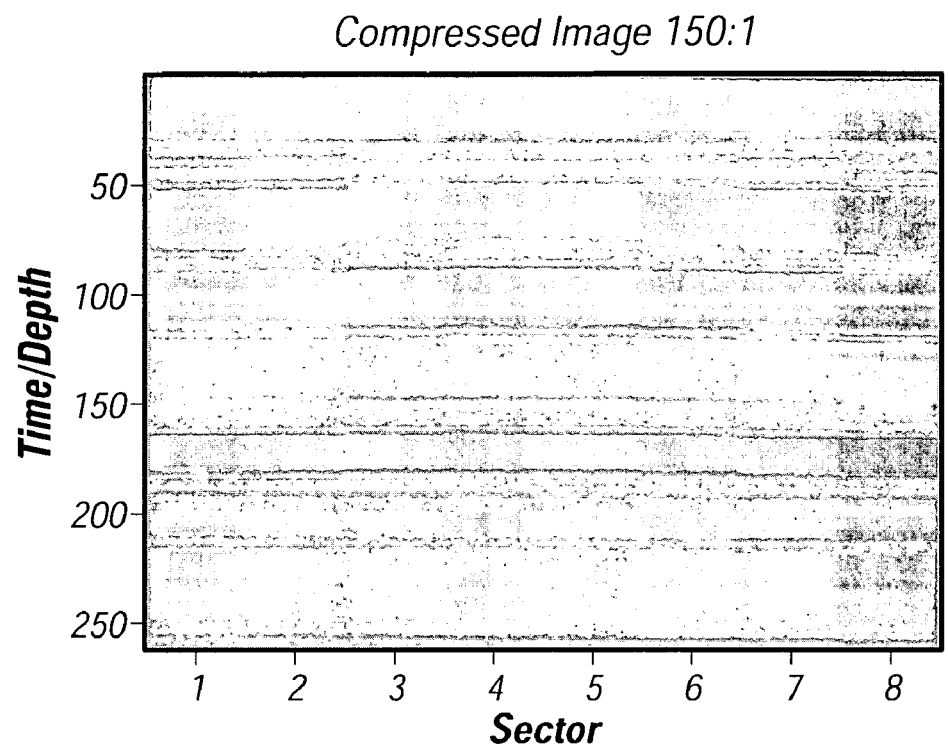
FIG. 11 illustrates an uncompressed image reconstructed using the present invention with a compression of 150:1.
Figure 12:
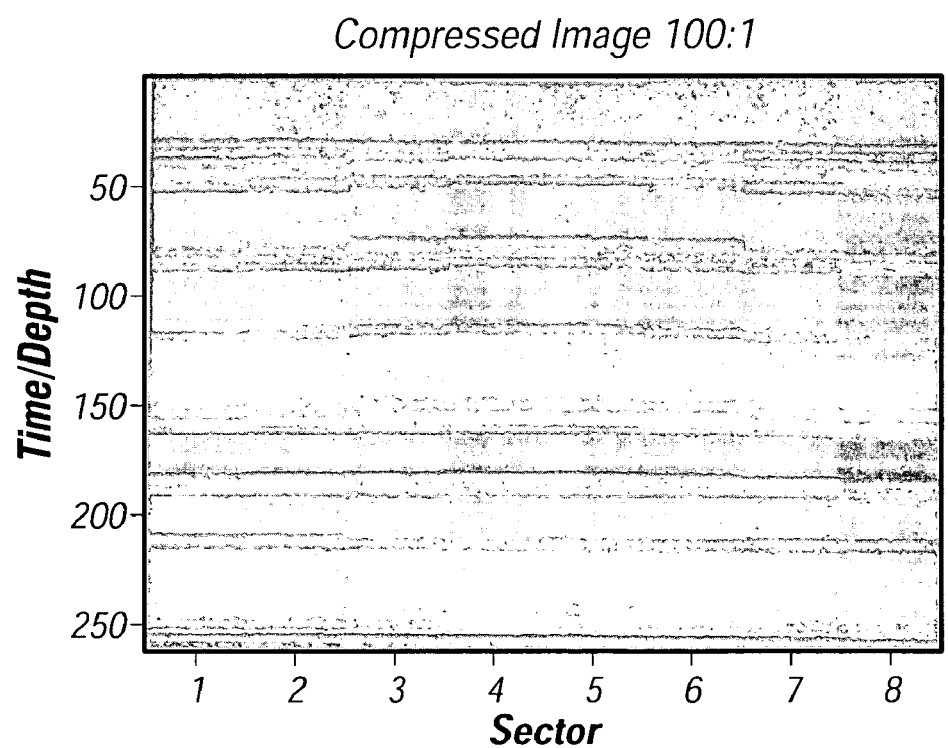
FIG. 12 illustrates an uncompressed image reconstructed using the present invention with a compression of 100:1.

Data Reconstruction: The executable file at the surface receives the data packet and the parameter which has been down linked. If the first bit is zero it generates the Apparent Dip angle parameters. If the first bit of the data is one it extracts the image. FIG. 9 shows raw data which has been compressed with three levels of compression using a multi-resolution compression algorithm like the Discrete Cosine Transform. FIG. 10 shows the data at one resolution that has been compressed with a relatively high compression ratio (with a compression of 300:1). FIG. 11 shows the data has been compressed with a medium compression ratio (with a compression of 150:1). FIG. 12 shows the data has been compressed with a relatively low compression ratio (a compression of 100:1 or three times as much data as for FIG. 10).

Display Module: The image represents structure of the earth so it may be more convenient to color map the image with "earth tone" colors. Because of human eyesight's natural high frequency roll-off, these frequencies play a less important role than low frequencies. The density data represent low resolution images, so it may be more convenient to smooth the image in the depth direction before displaying it. Also azimuthally sectored log data may be interpolated to generate a smooth image in both the depth direction and the azimuthally direction. A suitable linear interpolation and color map scheme may be implemented. Bed boundaries will display as sine waves.

Error Analysis: One of the most challenging problems in image compression is to measure the quality of image in terms of error. Even most of the common error analysis gives an indication to the amount of error in the image, it is necessary that an image with lower error measurement looks better than image with bigger error measurement.

Examples of two criteria that have been used to measure the error in the image as shown in equation 2 and equation 3.

$$acc\_Error = \sqrt{\frac{\sum_i^N \sum_j^M (RawData - Reconstructed)^2}{\sum_i^N \sum_j^M (RawData)^2}} \quad (2)$$

$$rms\_Error = \frac{\sqrt{\sum_i^N \sum_j^M (RawData - Reconstructed)^2}}{NM} \quad (3)$$

Figure 13:
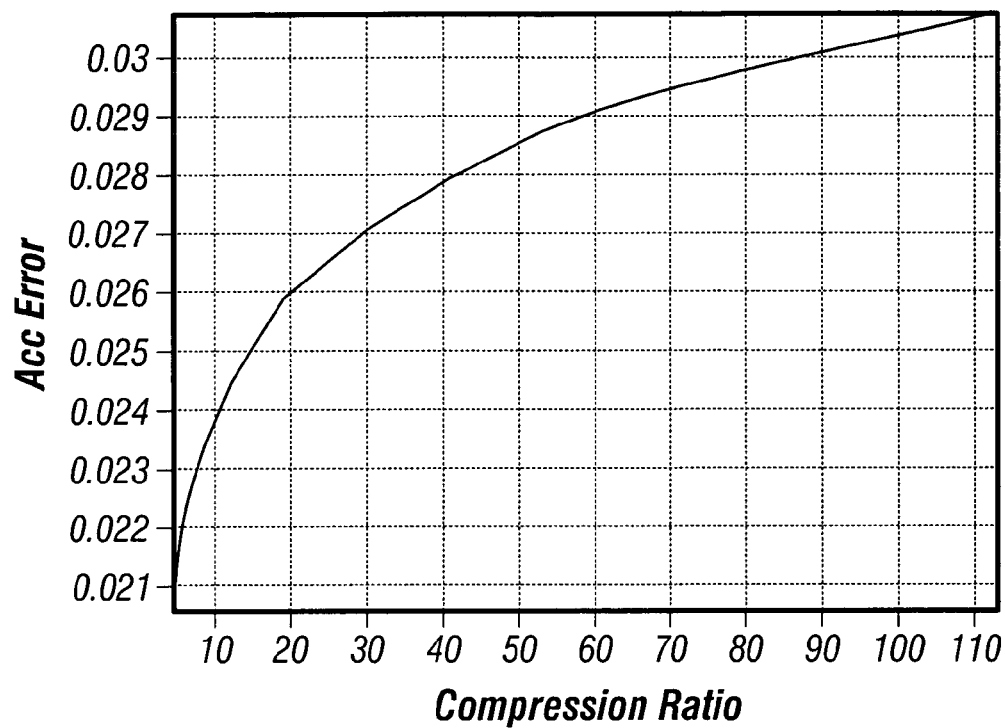
FIG. 13 illustrates the acc error versus the compression ratio.
Figure 14:
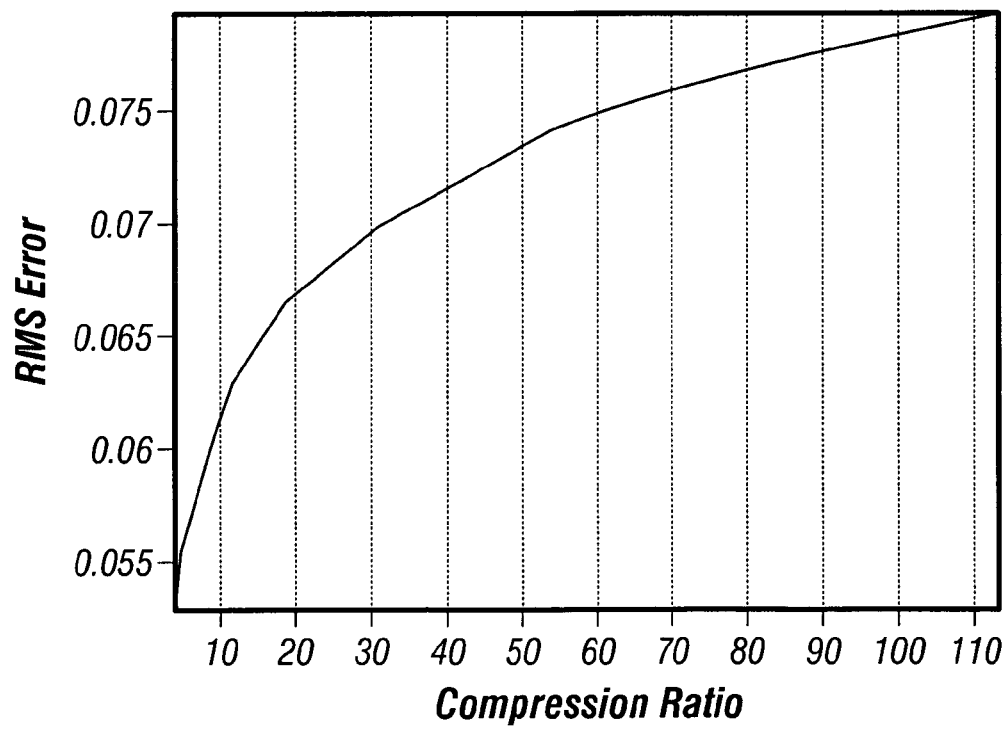
FIG. 14 illustrates the Root-mean-square (RMS) error versus the compression ratio.

The error measurements do not measure the image quality very precisely. FIG. 13 shows the acc error versus the compression ratio and FIG. 14 shows the Root-mean-square (RMS) error versus the compression ratio. The user's needs change according to the drilling conditions. In order to configure the tool according to the user's needs the tool has to be configured either on the surface or on the fly by downlink.

On the surface: A parameter table may be updated on the surface. In cases where the parameter table has not been updated the system will use default or preset values.

Down Link: In order to configure the system on the fly, down link commands are required. In cases where the tool has not been configured at the surface, a new configuration may be sent by a down link command. The data may be immediately available for use. The available configurations options are as in the following examples:

The portion of density data that needs to be transmitted:
a. The last block from the current location of the buffer; the block size is 8*128
b. the last N blocks
c. The entire image
d. The region/regions where the last feature/features has/have been located
e. The parameters or characteristics of the Apparent Dip Angle The level of compressed for the entire image
f. Low compression (e.g. 60:1)
g. Medium Compression (e.g. 90:1)
h. High Compression (e.g. 150:1)

The method of data transmission
i. On demand i.e. downlink
j. Periodic function generated by the master. The period function will be activated/deactivated on the surface and/or configure by a down link command. The period function commands are:
  i. Every power on transmit the last block of data
  ii. Every power on transmit the last region of interest
  iii. Every power on transmit the parameters of the apparent dip angle
  iv. Every power on transmit a combination from the above
  v. When the image is available (i.e. every 1280 sec)
  vi. When a region of interest is available i.e. check every 1280 sec
  vii. When the parameters of the apparent dip angle available i.e. every 320 sec.

Figure 15:
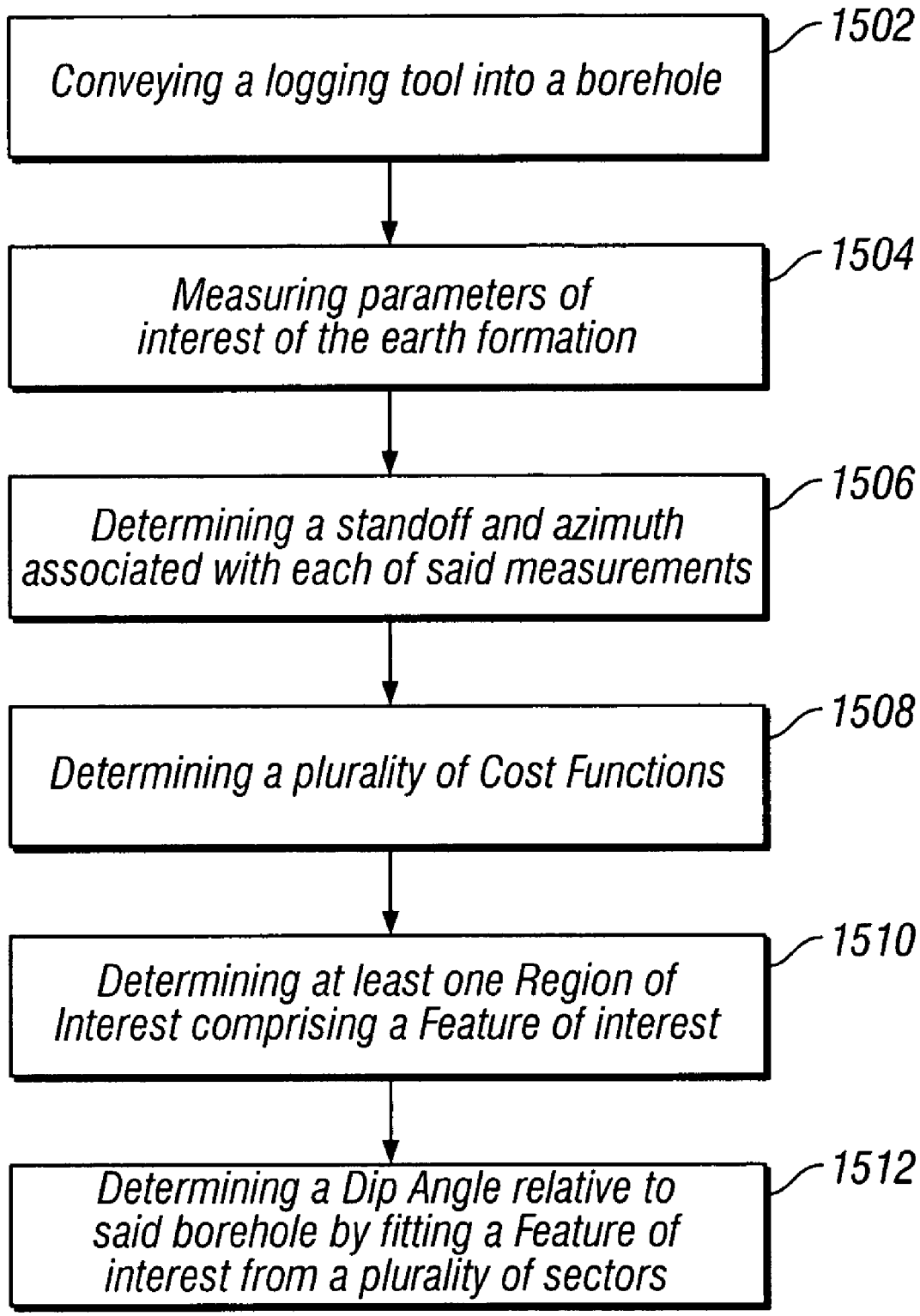
FIG. 15 is a flow chart of an embodiment of the present invention.

As illustrated in FIG. 15 the invention provides method and apparatus for logging an earth formation and acquiring subsurface information wherein a logging tool is conveyed in borehole 1502 to obtain parameters of interest 1504. The parameters of interest obtained may be density, acoustic, magnetic or electrical values as known in the art. As necessary, a standoff and azimuth associated with the measurements are obtained 1506 and corrections applied. The corrected data may be filtered and/or smoothed as necessary. The parameters of interest associated with azimuthal sectors are formed into a plurality of Cost Functions 1508 from which Regions of Interest are determined 1510 to resolve characteristics of the Features of interest within the Regions. Also, for initial delineation of Regions of Interest and associated Features, Cost Functions from a plurality of sectors may be combined to efficiently obtain prospective areas of the Cost Functions. The Features may be determined to obtain time or depth positions of bed boundaries and the Dip Angle 1512 of the borehole relative to subsurface structures, as well as the orientation of the logging equipment and subsurface structure. Characteristics of the Features include time, depth, dip of subsurface structure. The Regions of Interest may be generally characterized according to the behavior of the Regions in the neighborhood of various subsurface features. For example, a thin-bed type response may be characterized as shown in FIG. 5B where the Region of Interest spans two positive amplitude local maxima with a local minimum between the maxima. This is further illustrated in FIG. 5C by Region of Interest 501. FIG. 5C illustrates four types of Regions of Interest that have Features that may be identified, and illustrates how the Features are disposed about an arbitrary reference 509. The inverse of the 501 situation is illustrated by Region of Interest 503 where two minima bracket a maximum. Region of Interest 505 illustrates the situation where a Feature exists between in an area of maximum values which has a relatively fast transition to minimum values. Region of Interest 507 illustrates the situation where a Feature exists between in an area of minimum values which has a relatively fast transition to maximum values.

Figure 16:
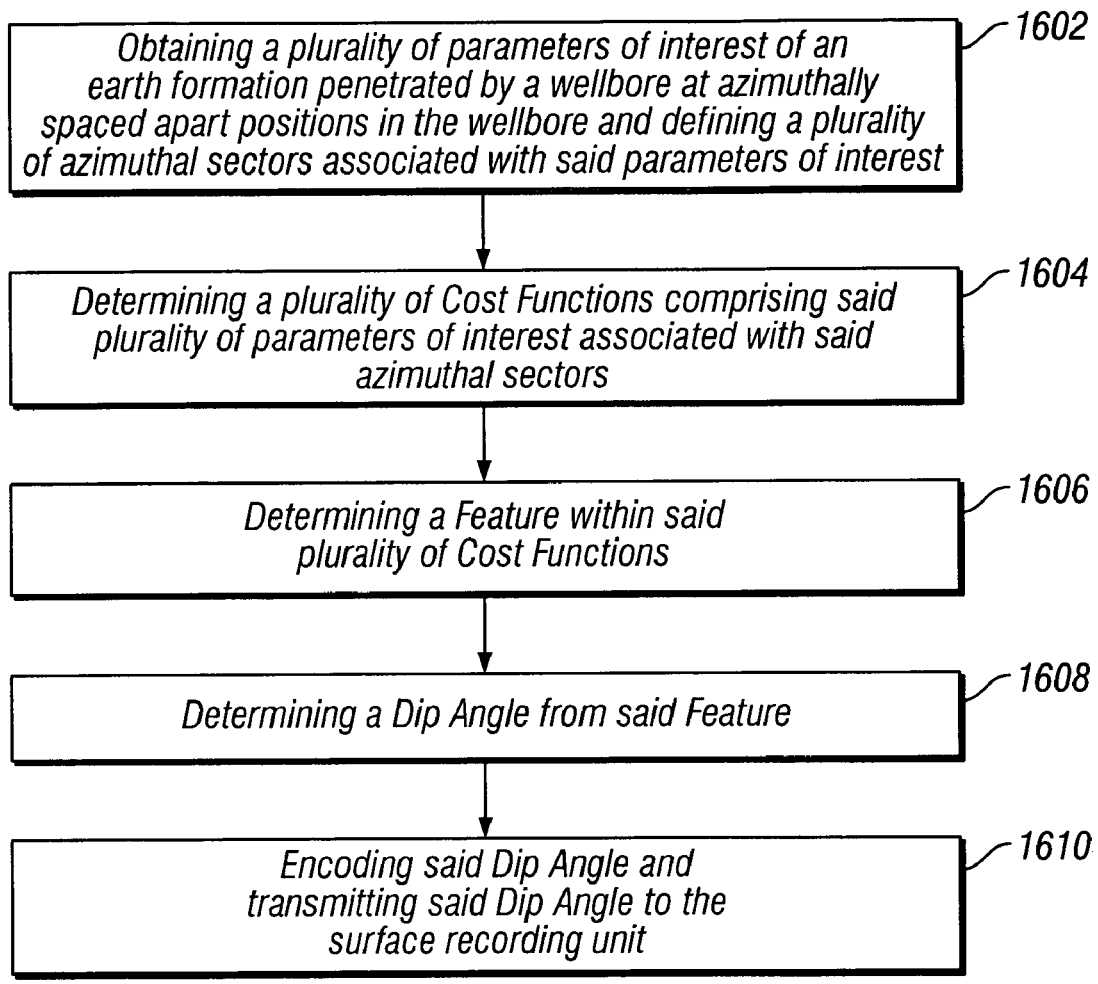
FIG. 16 is a flow chart of an embodiment of the present invention.

As illustrated in FIG. 16 the invention provides method and apparatus for logging an earth formation and obtaining a plurality of parameters of interest of an earth formation 1602 penetrated by a wellbore at azimuthally spaced apart positions in the wellbore and defining a plurality of azimuthal sectors associated with the parameters of interest. The parameters of interest obtained may be density, acoustic, magnetic or electrical values as known in the art. Pluralities of Cost Functions 1604 are determined from the plurality of parameters of interest associated with the azimuthal sectors. Features are determined within the plurality of Cost Functions 1606. A Dip Angle is determined from the Features 1608 determined from the Cost Functions. The Dip Angle is then encoded 1610 and transmitted to the surface recording unit for further uses.

Figure 17:
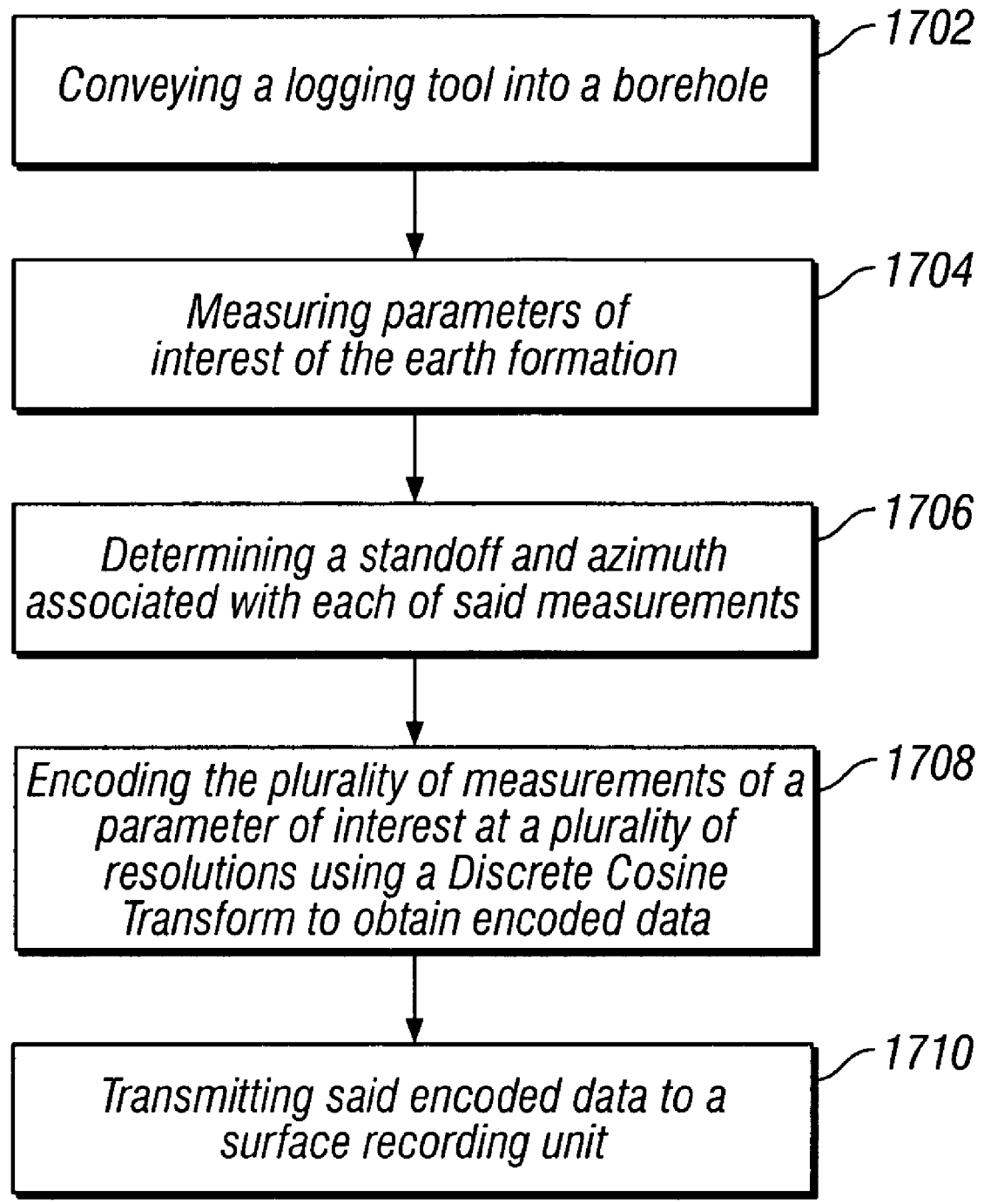
FIG. 17 is a flow chart of an embodiment of the present invention.

As illustrated in FIG. 17 the invention provides method and apparatus for logging an earth formation and acquiring subsurface information wherein a logging tool is conveyed in borehole 1702 to obtain parameters of interest 1704. The parameters of interest obtained may be density, acoustic, magnetic or electrical values as known in the art. As necessary, a standoff and azimuth associated with the measurements are obtained 1706 and corrections applied. The corrected data may be filtered and/or smoothed as necessary. At this point, the parameters of interest associated with azimuthal sectors may be encoded at a plurality of resolutions using a Discrete Cosine Transform to obtain encoded data 1708 that may be transmitted to the surface 1710. FIGS. 10, 11 and 12 demonstrate the recombination of the plurality of resolutions as the compression changes from 300:1 in FIG. 10, 150:1 in FIG. 11 and finally 100:1 as the third input of resolution is combined.

In another aspect, the present invention provides for transmitting data as computed values of one or more downhole parameters of interest or characteristics based at least in part on the dip angle and/or orientation measurements. As it is known, real time imaging and apparent dip angle calculations are important parameters for real-time geosteering of the drilling assembly and for real-time determination of formation parameters. The data communication between the downhole and surface equipment typically has limited bandwidth, particularly when drilling mud is utilized as the transmission channel. In one aspect of the present invention, real-time apparent dip is calculated downhole (i.e. by the downhole processor) and transmitted uphole, which utilize a few bits of data. This method is useful because calculations used downhole can be extensive.

As noted above, the parameters of interest apparent dip angle and/or orientation can be used to define regions of interest (i.e. feature extraction). Data and/or computed parameters relating to formation can then be transmitted when the dip and/or orientation meet a certain criteria or threshold. In this manner, the data relating to the region of interest is compressed and sent to the surface. This method can significantly increase the ability to compress data and still provide desired resolution. The apparent dip angle calculations may be based on the region of interest. Also, the calculations of the apparent dip angle based on feature extraction can eliminate uncertainties of local-minimum, local maximum, window size, etc., thereby improving the accuracy of the computed values.

Thus, according to one aspect of the invention, the system determines the dip angle and/or tool orientation downhole, selects the dip angle and/or tool orientation that will be sent to the surface, and then sends the data relating to the dip angle and other parameters to the surface. The dip and/or orientation may be sent to the surface if it covers a region of interest and based on predetermined or selected criteria. For example, the predetermined criteria may be that dips above ten (10) degrees define regions of interest. Thus, regions with dips less than ten (10) degrees may be of no interest. For such regions, selected sensors and/or processing of data may be turned off, and turned on when the dip angle meets the criteria. In this manner dip and orientation may be used to select what data (from one or more downhole sensors or tools) to send to the surface. Other examples may be that the system may be programmed or configured to (i) send data from all or selected sensors when a dip is present; (ii) send only selected data, for example, gamma ray data, if no dips are present; (iii) send gamma ray and resistivity data when dip are above a certain angle; and (iv) send data for selected or all sensors when the dip angle meets the selected criteria. Thus, in general, the downhole calculations of dip angle and orientation may be used as a base or criterion (whole or in part) to determine what type of data and how much of the data to transmit to the surface.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging an earth formation comprising:
   determining downhole a first parameter of interest that is one of a dip angle of a bed and an orientation of a bed using a sensor;
   determining when the first parameter of interest meets a selected criterion using a processor;
   using the processor to transmit data relating to at least one additional parameter of interest relating to the earth formation when the first parameter of interest meets the selected criterion; and
   storing the transmitted data to a suitable storage medium.

2. The method of claim 1, wherein the first parameter of interest is an apparent dip angle and the criterion is that the dip angle is at least ten (10) degrees.

3. The method of claim 1, wherein the at least one additional parameter is at least one of i) a gamma ray measurement; (ii) a resistivity measurement; (iii) an acoustic measurement; and (iv) a nuclear magnetic resonance measurement.

4. The method of claim 3, wherein the first parameter of interest is the dip angle and further comprising transmitting data related to gamma ray measurements only when the dip angle is below a threshold.

5. The method of claim 1, wherein the first parameter of interest is the dip angle and further comprising transmitting data relating to a plurality of downhole parameters and the dip angle when the dip angle meets the selected criterion.

6. The method of claim 1 wherein the additional parameter of interest is selected from the group consisting of: i) density, ii) porosity, iii) electrical resistivity, iv) a nuclear magnetic resonance property, and v) acoustic reflectance.

7. The method of claim 1 further comprising using the processor to encode the first parameter of interest and transmit the first parameter of interest to a surface recording unit.

8. The method of claim 7 wherein encoding the first parameter of interest further comprises compressing the first parameter of interest using a transform for multi-resolution image compression.

9. A downhole tool for use in a wellbore, comprising:
   a sensor configured to make measurements relating to a dip angle;
   a plurality of sensors configured to make measurements relating to parameters of an earth formation traversed by the wellbore; and a processor configured to determine the dip angle and transmit data relating to at least one sensor in the plurality of sensors when the determined dip angle meets a selected criterion.

10. The tool of claim 9, wherein the plurality of sensors includes at least one of (i) a gamma ray sensor; (ii) a resistivity sensor; (iii) an acoustic sensor; (iv) a nuclear magnetic resonance (NMR) sensor; and (v) a nuclear priority sensor.

11. The tool of claim 9, wherein the processor is configured to transmit the data relating to at least one sensor in the plurality of sensors when the dip angle is greater than ten (10) degrees.

12. The tool of claim 9, wherein the processor is configured to transmit gamma ray data when the dip angle does not meet the selected criterion.

13. The tool of claim 9, wherein the processor is further configured to encode the dip angle and transmit the dip angle to the surface recording unit.

14. The tool of claim 13 wherein the processor is further configured to compress the dip angle using a transform for multi-resolution image compression to encode the dip angle.

* * * * *

UNITED STATES PATENT AND TRADEMARK OFFICE
CERTIFICATE OF CORRECTION

| | |
|---|---|
| PATENT NO. | : 7,647,182 B2 |
| APPLICATION NO. | : 11/331502 |
| DATED | : January 12, 2010 |
| INVENTOR(S) | : Gamal Hassan and Philip L. Kurkoski |

It is certified that error appears in the above-identified patent and that said Letters Patent is hereby corrected as shown below:

Column 18, claim 6, line 51, delete "the additional", insert --the at least one additional--; and Column 20, claim 13, line 6, delete "to the", insert --to a--.

Signed and Sealed this

Ninth Day of February, 2010

David J. Kappos
*Director of the United States Patent and Trademark Office*